(12) United States Patent
Caretta (10) Patent No.: US 6,763,868 B1
(45) Date of Patent: *Jul. 20, 2004

(54) TIRE FOR A TWO-WHEELED VEHICLE AND CARCASS STRUCTURE FOR THE TIRE

(75) Inventor: Renato Caretta, Gallarate (Varese) (IT)

(73) Assignee: Pirelli Pneumatici S.P.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/364,099

(22) Filed: Jul. 30, 1999

Related U.S. Application Data (60) Provisional application No. 60/134,228, filed on May 14, 1999, and provisional application No. 60/106,104, filed on Oct. 29, 1998.

(30) Foreign Application Priority Data

Jul. 31, 1998 (EP) .............................................. 98830472
Apr. 19, 1999 (EP) .............................................. 99830225

(51) Int. Cl.⁷ ............................. B60C 9/02; B60C 15/00
(52) U.S. Cl. ....................... 152/550; 152/540; 152/541; 152/546; 152/547; 156/117
(58) Field of Search ................................ 152/548, 550, 152/539, 540, 541, 546, 547; 156/117, 397, 133

(56) References Cited

U.S. PATENT DOCUMENTS

| | | | |
|---|---|---|---|
| 1,728,957 A | | 9/1929 | Dickinson |
| 3,072,171 A | | 1/1963 | Drakeford |
| 3,240,250 A | | 3/1966 | Frazier |
| 3,826,297 A | | 7/1974 | Alderfer |
| 4,248,287 A | | 2/1981 | Christman |
| 5,362,343 A | | 11/1994 | Debroche |
| 5,419,384 A | * | 5/1995 | Iseki .......................... 152/548 |
| 5,632,836 A | * | 5/1997 | Verschoor et al. .......... 156/136 |
| 5,660,656 A | | 8/1997 | Herbelleauu |
| 5,702,548 A | | 12/1997 | Arnaud et al. |
| 5,705,007 A | | 1/1998 | Bohm |
| 6,318,432 B1 | | 11/2001 | Caretta et al. |
| 6,328,084 B1 | | 12/2001 | Caretta et al. |
| 6,457,504 B1 | | 10/2002 | Caretta |
| 2001/0023737 A1 | | 9/2001 | Caretta et al. |
| 2001/0042587 A1 | | 11/2001 | Caretta et al. |
| 2002/0011297 A1 | | 1/2002 | Caretta et al. |
| 2002/0029841 A1 | | 3/2002 | Caretta et al. |
| 2002/0056498 A1 | | 5/2002 | Caretta et al. |
| 2002/0189737 A1 | | 12/2002 | Caretta |

FOREIGN PATENT DOCUMENTS

| | | |
|---|---|---|
| EP | 0467277 A1 | 1/1992 |
| EP | 0664231 | 7/1995 |
| EP | 928702 A1 * | 7/1999 |
| FR | 384231 | 4/1908 |

OTHER PUBLICATIONS

English Language Derwent Abstract of EP 0,664,231.
English Language Abstract of EP 0,664,231.

* cited by examiner

Primary Examiner—Geoffrey L. Knable
(74) Attorney, Agent, or Firm—Finnegan, Henderson, Farabow, Garrett & Dunner, L.L.P.

(57) ABSTRACT

A carcass structure for a two-wheeled vehicle tire includes at least one carcass ply and a pair of annular reinforcing structures. The at least one carcass ply includes a first series and at least one second series of strip sections circumferentially distributed in a mutually-alternated sequence around a geometric rotation axis of the tire. Each strip section includes longitudinal and parallel thread elements at least partly coated with at least one layer of elastomer material and extends in a substantially U-shaped configuration to define two side portions and a crown portion. The annular reinforcing structures are applied against end flaps of the first series of strip sections and are overlapped by end flaps of the at least one second series of strip sections. Each of the annular reinforcing structures includes an annular anchoring insert, including one or more elongated elements extending in radially-concentric coils, and at least one filling body.

31 Claims, 4 Drawing Sheets

TIRE FOR A TWO-WHEELED VEHICLE AND CARCASS STRUCTURE FOR THE TIRE

CROSS-REFERENCES TO RELATED APPLICATIONS

Application claims the right of priority under 35 U.S.C. §119(a)–(d) based on patent application No. 98830472.1, filed Jul. 31, 1998, in European Patent Office, and patent application No. 99830225.1, filed Apr. 19, 1999, in the European Patent Office; further, Applicant claims the benefit 35 U.S.C. §119(e) based on prior-filed, copending provisional application No. 60/106,104, filed Oct. 29, 1998, in the U.S. Patent and Trademark Office, and prior-filed, copending provisional application No. 60/134,228, filed May 14, 1999, in the U.S. Patent and Trademark Office.

The present invention relates to a method of manufacturing a carcass structure for tyres, in particular for two-wheeled vehicles, comprising the steps of: preparing strip-like sections each comprising longitudinal and parallel thread-like elements at least partly coated with at least one layer of raw elastomer material; making at least one carcass ply by laying down and circumferentially distributing said strip-like sections on a toroidal support, each of said strip-like sections extending in a U-shaped configuration around the cross-section outline of the toroidal support, to define two side portions mutually spaced apart in an axial direction, and a crown portion extending at a radially outer position between the side portions; applying annular reinforcing structures to an area close to inner at circumferential edges of said at least one carcass ply.

The invention also relates to a carcass structure for tyres obtainable by the above mentioned method, said carcass structure comprising: at least one carcass ply comprising strip-like sections circumferentially distributed around a geometric rotation axis, and each comprising at least two thread-like elements disposed longitudinally and parallelly of each other and at least partly coated with at least one layer of raw elastomer material, each of said strip-like sections extending in a substantially U-shaped conformation around the cross-section outline of the carcass structure, to define two side portions spaced apart from each other in an axial direction, and a crown portion extending at a radially outer position between the side portions.

Accomplishment of tyres for vehicle wheels involves formation of a carcass structure essentially made up of one or more carcass plies of a substantially toroidal conformation and having their axially opposite side edges in engagement with respective circumferentially-inextensible annular reinforcing elements, usually called "bead rings".

Applied to the carcass structure, at a circumferentially outer position thereof, is a belt structure comprising one or more belt strips in the form of a closed ring, essentially consisting of textile or metal cords suitably oriented relative to each other and to the cords belonging to the adjacent carcass plies.

A tread band currently consisting of a strip of elastomer material of appropriate thickness is applied to the belt structure, at a circumferentially external position thereof.

It is to point out that, to the aims of the present description, by the term "elastomer material" it is intended a rubber blend in its entirety, that is the assembly made up of at least one polymer base suitably amalgamated with reinforcing fillers and/or process additives of various types.

Finally, to the opposite sides of the tyre being manufactured a pair of sidewalls is applied, each of them covering a side portion of the tyre included between a so-called shoulder region, located close to the corresponding side edge of the tread band, and a so-called bead located at the corresponding bead ring.

In accordance with traditional production methods, essentially, the above listed tyre components are first made separately from each other, to be then assembled during a tyre-manufacturing step.

It is the Applicant's feeling that these production methods are so far at least partly unsatisfactory in terms of quality of the finished product, and that they have some critical points as regards accomplishment of the process which is complicated and hardly governable.

For instance, for making the carcass ply or plies to be associated with the bead rings so as to form the carcass structure, it is required that, by an extrusion and/or calendering process, a rubberized fabric comprising longitudinally-disposed continuous textile or metal cords should be first produced. This rubberized fabric is submitted to a transverse-cutting operation to produce sections of predetermined sizes that are subsequently joined together so as to give origin to a continuous ribbon-like semifinished product, having transversely-disposed parallel cords.

This article of manufacture will be then cut into sections the length of which is correlated with the circumferential extension of the carcass to be made.

Production methods have been also proposed which, instead of resorting to the production of semifinished products, make the carcass structure directly during the tyre-manufacturing step.

For example, U.S. Pat. No. 5,362,343 discloses a method and an apparatus forming a carcass ply starting from a single cord previously wound around a reel.

According to the method and apparatus described in the above patent, at each operating cycle of the apparatus the cord drawn from the reel by power-driven idler rollers and maintained taut by a pneumatic tensioning system is cut to size to obtain a section of predetermined length.

The cord section is picked up by a pick-up element mounted on a belt wound over power-driven pulleys to be extended transversely on the outer surface of a toroidal support.

The section ends are then engaged by bending members of the belt type operating on the opposite sides of the toroidal support for radially applying the cord section to the toroidal support by means of slide elements acting like fingers along the side portions of the cord section.

Repetition of the above described operating cycle leads to deposition of a number of cord sections circumferentially disposed in side by side relationship until the whole circumferential extension of the toroidal support has been covered.

Necessarily, the toroidal support is previously coated with a layer of raw rubber having a dual function, i.e. that of adhering to the cords deposited thereon so as to conveniently hold them in a fixed positioning, and that of constituting an air-proof inner liner in the finished tyre.

Tyres obtained by this production method have a carcass structure in which the carcass ply or plies consist of individual cords each having two side portions axially spaced apart from each other and oriented radially of the rotation axis of the tyre, and a crown portion extending at a radially outer position between the side portions.

Within the scope of the carcass structure manufacture, it is also known that close to each of the tyre beads, the opposite ends of the individual cords forming a carcass ply are arranged, in an alternating sequence, at axially opposite positions relative to an annular anchoring element forming said bead ring, having the form of a crown made up of wire coils radially superposed on each other, as can be seen from patent EP 0 664 231 and patent U.S. Pat. No. 5,702,548. According to the teachings of these documents, a filling body of elastomer material is necessarily interposed between the anchoring annular insert and the threads or wires forming the carcass ply or plies.

In patent FR 384 231, to which rererence is herein made as an example of the most pertinent state of the art, accomplishment of a carcass structure is proposed which involves deposition, on a toroidal support, of a series of rectangular small bands of rubberized fabric circumferentially disposed in side by side relationship and arranged in radial planes relative to the geometric axis of the support drum itself. Deposition of the small bands is carried out in such a manner that the end flaps of two non-consecutive small bands are partly covered with the end flaps of the small band interposed therebetween. The existing spaces between the end flaps covered with the small bands are filled with trapezoidal inserts applied to the end flaps of the small band placed in an overlapping position thereon. Deposition of the small bands is carried out in different superposed layers, the number of which is correlated with the thickness to be given to the carcass structure. The presence of said trapezoidal inserts gives rise to thickening of the carcass structure at the bead regions so that thickness at the bead rings is twice that at the crown.

In U.S. Pat. No. 4,248,287 a method is disclosed according to which formation of the carcass structure contemplates the step of laying down on a toroidal drum, a plurality of layers each formed of radial strips made up of rubberized wires and circumferentially disposed in side by side relationship. When deposition has been completed, two bead rings are applied to the bead region and around said rings the end flaps of the carcass layers formed of the radial strips are turned back.

The Applicant has found that important advantages can be achieved both in terms of simplification of the production processes and in terms of improvement of the behavioural features of the tyre, if the carcass ply or plies are made by conveniently laying down on a rigid toroidal support, strip-like sections each comprising a plurality of cords parallel to each other, incorporated into an elastomer layer.

In this connection, the Applicant has already developed several different manufacturing methods being the object of respective European patent applications.

For instance, in the European patent application Nos. 97830731.2 and 97830733.8 a manufacturing method and a tyre are respectively disclosed in which the carcass structure is accomplished by making a first and a second carcass plies each obtained by strip-like sections sequentially laid down in mutual circumferential side by side relationship.

Tyres obtained in accordance with that which is described in the above patent applications have the end portions of the strip-like sections belonging to the first and second carcass plies disposed on opposite sides respectively, relative to the annular reinforcing structures of the beads.

This expedient, in combination with the respectively crossed orientation of the strip-like sections belonging to one and the other plies, offers important advantages in terms of structural strength of the tyre close to the beads and sidewalls.

In the European patent application No. 98830472.1, in the name of the sane Applicant as well, accomplishment of a carcass ply is proposed which involves deposition of a first and a second series of strip-like sections in an alternating sequence, in which the sections belonging to the first and second series terminate at respectively opposite sides relative to the reinforcing structures at the beads.

Thus important advantages can be achieved in terms of structural strength at the tyre beads and sidewalls, even in the presence of a single carcass ply.

In accordance with the present invention, it has been found that the above mentioned new manufacturing concepts developed by the Applicant and all the advantageous aspects correlated therewith can be also advantageously utilized in the field of tyre manufacture for motorcycles and the like, if particular construction expedients are adopted in making the reinforcing structures at the beads.

In more detail, the Applicant has become aware of the fact that by the construction methodology they have developed, it is surprisingly possible to obtain satisfactory qualities of structural strength at the beads even with use of reinforcing structures comprising a single annular insert formed of at least one elongated element wound up into radially superposed coils. The Applicant has also become aware of the fact that a carcass structure having such annular reinforcing structures at the beads is particularly suitable for manufacturing tyres for motorcycles utilizing the manufacturing methods providing accomplishment of the carcass ply by deposition of strip-like sections on a rigid toroidal support.

In more detail, the invention relates to a method of manufacturing a carcass structure for motor-vehicle tyres, characterized in that accomplishment of each annular reinforcing structure comprises the steps of: laying down at least one elongated element in concentric coils so as to form an annular anchoring insert substantially in the form of a crown, forming at least one filling body of raw elastomer material, joining the filling body to said annular anchoring insert.

In a preferential embodiment, accomplishment of said carcass ply comprises the steps of: laying down on the toroidal support, a first series of said strip-like sections circumferentially distributed with a circumferential pitch corresponding to a multiple of the width of the strip-like sections; applying said annular reinforcing structures against end flaps of said strip-like sections belonging to the first series; laying down on the toroidal support at least one second series of said strip-like sections each extending in a U-shaped conformation around the cross-section outline of the toroidal support, between two consecutive sections of the first series to define said carcass ply therewith, each of the sections of the second series having end flaps overlapping the respective annular reinforcing structures at an axially opposite position relative to the end flaps of the sections of the first series.

It is also preferably provided that the crown portions of the strip-like sections should be consecutively disposed in side by side relationship along the circumferential extension of the toroidal support.

It may be also provided that the side portions of each strip-like section belonging to the first series should be each partly covered with a side portion of at least one circumferentially consecutive section belonging to the second series, at a stretch included between a radially outer edge of the annular reinforcing structure and a transition region between said side portions and crown portions.

In more detail, covering of the side portions of each strip-like section belonging to the first series progressively decreases starting from a maximum value close to the outer circumferential edge of each annular reinforcing structure until a zero value at the transition regions between said side portions and crown portions.

Preferably the side portions of said strip-like sections are caused to radially converge in the direction of the geometric rotation axis of the toroidal support.

Also provided may be at least one operating step aiming at defining regions of increased width close to the inner circumferential edges of the carcass structure.

If, as provided in a preferential embodiment, preparation of said strip-like sections takes place by cutting actions sequentially carried out on at least one continuous strip-like element incorporating said thread-like elements into said layer of raw elastomer material, the step of defining regions of increased width can be advantageously carried out on the continuous strip-like element before execution of the cutting action.

In accordance with a further aspect of the invention, said elongated element is preferably laid down directly against the carcass ply, and more particularly against the end flaps of the strip-like sections belonging to the first series, so as to form the annular anchoring insert directly in contact with the strip-like sections themselves.

The filling body, preferably located at a radially outer position relative to said annular anchoring insert, can be, in turn, formed by laying down a continuous strip of elastomer material directly against the annular insert itself, previously applied to the end flaps of the strip-like sections belonging to the first series.

It is a further object of the invention a carcass structure for tyres of vehicle wheels characterized in that it further comprises a pair of annular reinforcing structures engaged at an area close to respective inner circumferential edges of the carcass ply and each comprising: an annular anchoring insert substantially in the form of a crown disposed coaxially with the carcass structure and adjacent to an inner circumferential edge of the carcass ply, said annular insert being formed of at least one elongated element extending in concentric coils; a filling body of raw elastomer material joined to said annular anchoring insert.

More particularly, said carcass ply is preferably provided to comprise a first and a second series of strip-like sections disposed in a mutually alternating sequence along the circumferential extension of the carcass structure, each of said annular reinforcing structures having an axially inner side turned towards end flaps of the sections belonging to the first series and a axially outer side turned towards end flaps of the sections belonging to the second series.

Preferably, the crown portions belonging to the sections of the first and second series respectively are disposed in mutual side by side relationship along the circumferential extension of the carcass structure.

The side portions of each strip-like section belonging to the first series may be provided to be each partly covered with a side portion of at least one adjacent strip-like section belonging to the second series, at a stretch included between a radially outer edge of the annular reinforcing structure and a transition region between said side portions and crown portions.

In more detail, covering of the side portions of each strip-like section belonging to the first series progressively decreases starting from a maximum value at an area close to the outer circumferential edge of each annular reinforcing structure until a zero value at the transition regions between said side portions and crown portions.

Advantageously, the side portions of said strip-like sections radially converge in the direction of the geometric rotation axis of the carcass structure.

The individual strip-like sections belonging to one of said first and second series respectively are advantageously disposed with a circumferential distribution pitch corresponding to a multiple of the width of the strip-like sections themselves.

Each strip-like section may be provided to have regions of increased width at an area close to the inner circumferential edges of the carcass structure.

In this case, the thread-like elements included in each strip-like section are mutually spaced apart at said regions of increased width.

Preferably, each of said strip-like sections has a width included between 3 mm and 15 mm, and comprises three to eight thread-like elements.

In particular, said thread-like elements are disposed in the respective strip-like sections according to a mutual distance between centres which is not lower than 1.5 times the diameter of said thread-like elements.

According to a further aspect of the invention, said annular anchoring insert has a single series of radially-superposed concentric coils.

It is also preferably provided that said filling body should radially extend from said annular anchoring insert, tapering away therefrom.

In more detail, the ratio between the radial extension of the annular anchoring insert and said filling body can be advantageously included between 0.5 and 2.5.

Conveniently, said filling body of elastomer material has a hardness included between 48° and 55° Shore D at 23° C.

Further features and advantages will become more apparent from the detailed description of a preferred, non-exclusive, embodiment of a method of manufacturing a carcass structure for tyres, in particular for two-wheeled vehicles, and a carcass structure obtainable by said method, in accordance with the present invention. This description will be set forth hereinafter with reference to the accompanying drawings, given by way of non-limiting example, in which.

With reference to the drawings, a tyre, in particular for two-wheeled vehicles, having a carcass structure 2 in accordance with the present invention, has been generally identified by reference numeral 1.

The carcass structure 2 has at least one carcass ply 3 having a substantially toroidal conformation and engaged, by its own opposite circumferential edges, with a pair of annular reinforcing structures 4 (only one of which is shown in the drawings), each of them, when the tyre manufacture is over, being located at the region usually identified as "bead".

Applied to the carcass structure 2, at a circumferentially outer position, is a belt structure 5 comprising at least one primary belt strip 7, formed of one or more continuous cords wound up into coils axially disposed in side by side relationship and substantially parallel to the circumferential extension direction of the tyre, as well as possible auxiliary belt strips 6a, 6b located at a radially inner position relative to the primary belt strip 7. Circumferentially superposed on the belt structure 5 is a tread band 8 in which, following a moulding operation carried out concurrently with the tyre vulcanization, longitudinal and/or transverse grooves 8a are formed which are disposed to define a desired "tread pattern".

The tyre also comprises a pair of so-called "sidewalls" 9 laterally applied to the carcass structure 2 on opposite sides thereof.

The carcass structure 2 may also be coated on its inner walls with an air-proof layer 10, i.e. a so-called "liner", essentially consisting of a layer of elastomer material impervious to air, suitable to ensure a hermetic seal of the inflated tyre.

Figure 1:
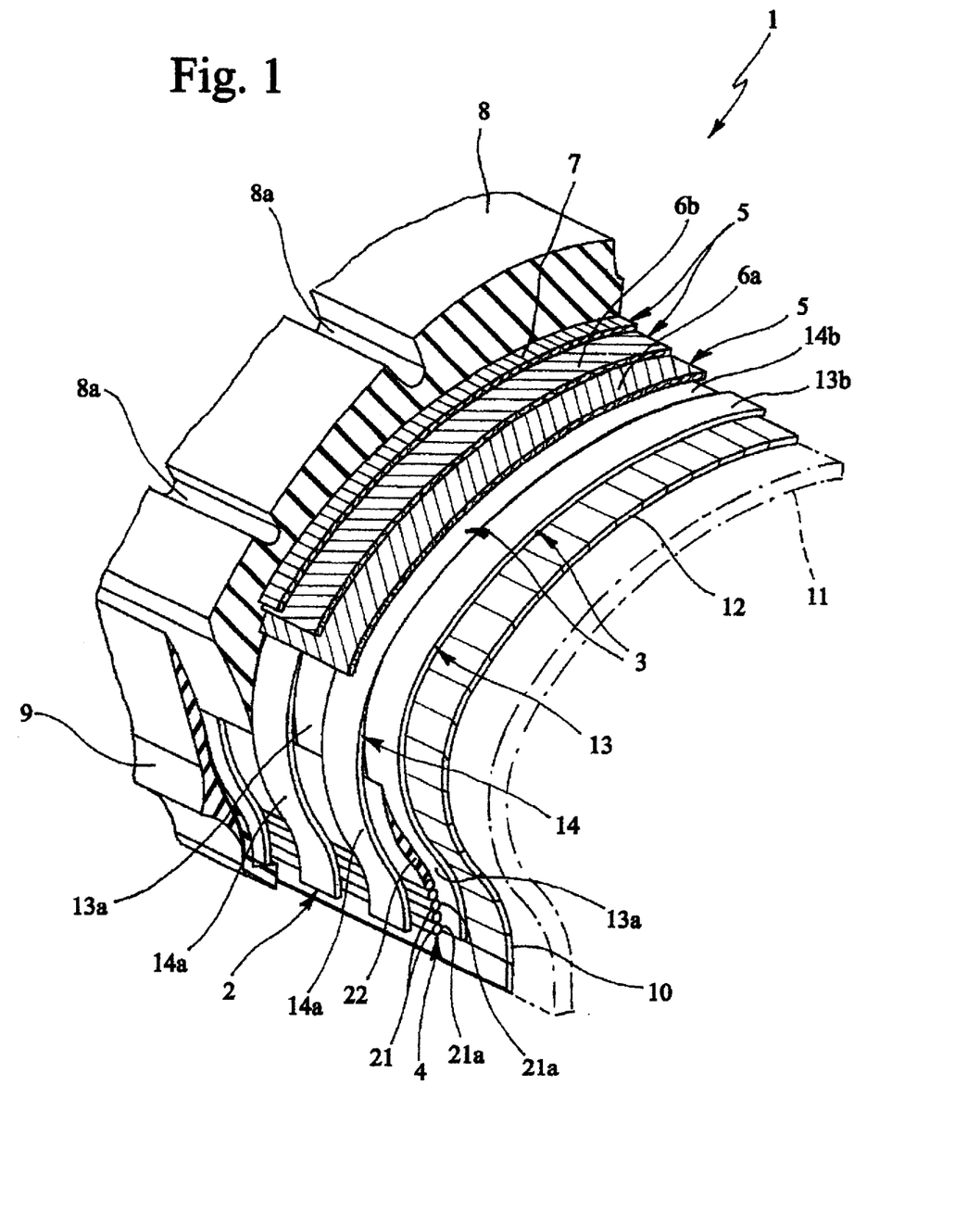
FIG. 1 is a fragmentary and split perspective view of a tyre provided with a carcass structure manufactured in accordance with the present invention.

Assembling of the above-listed components, as well as production of one or more of same, takes place with the aid of a toroidal support 11, diagrammatically shown in FIG. 1, having the configuration of the inner walls of the tyre to be manufactured.

The toroidal support 11 may have reduced sizes compared with those of the finished tyre, according to a linear amount preferably included between 2% and 5% measured, just as an indication, along the circumferential extension of the support itself at an equatorial plane X—X thereof which is coincident with the equatorial plane of the tyre itself.

The toroidal support 11, which is not described or illustrated in detail as it is not particularly of importance to the aims of the invention, may for example consist of a collapsible drum or an inflatable bladder suitably reinforced, so that it may take and maintain the desired toroidal conformation under inflated conditions.

After the above statements, manufacture of tyre 1 first involves formation of the carcass structure 2, starting with possible formation of liner 10.

This liner 10 can be advantageously made by circumferentially winding around the toroidal support 11 at least one ribbon-like small band 12 of air-proof elastomer material, produced from an extruder and/or calender located close to the toroidal support itself. As can be viewed from FIG. 1, winding of the ribbon-like small band 12 substantially takes place in circumferential coils consecutively disposed in side by side relationship to follow the cross-section outline of the outer surface of the toroidal support 11.

For descriptive purposes, by "cross-section outline" it is herein intended a configuration exhibited by the half-section of the toroidal support 11 sectioned along a plane radial to a geometric rotation axis thereof, not shown in the drawings, which is coincident with the geometric axis of rotation of the tyre, and therefore the carcass structure 2 being manufactured.

In accordance with the present invention, the carcass ply 3 is directly formed on the toroidal support 11 by, as better clarified in the following, laying down a first and a second series of strip-like sections 13, 14 drawn from at least one continuous strip-like element 2a preferably having a width included between 3 and 15 mm.

Figures 2, 3, 4:
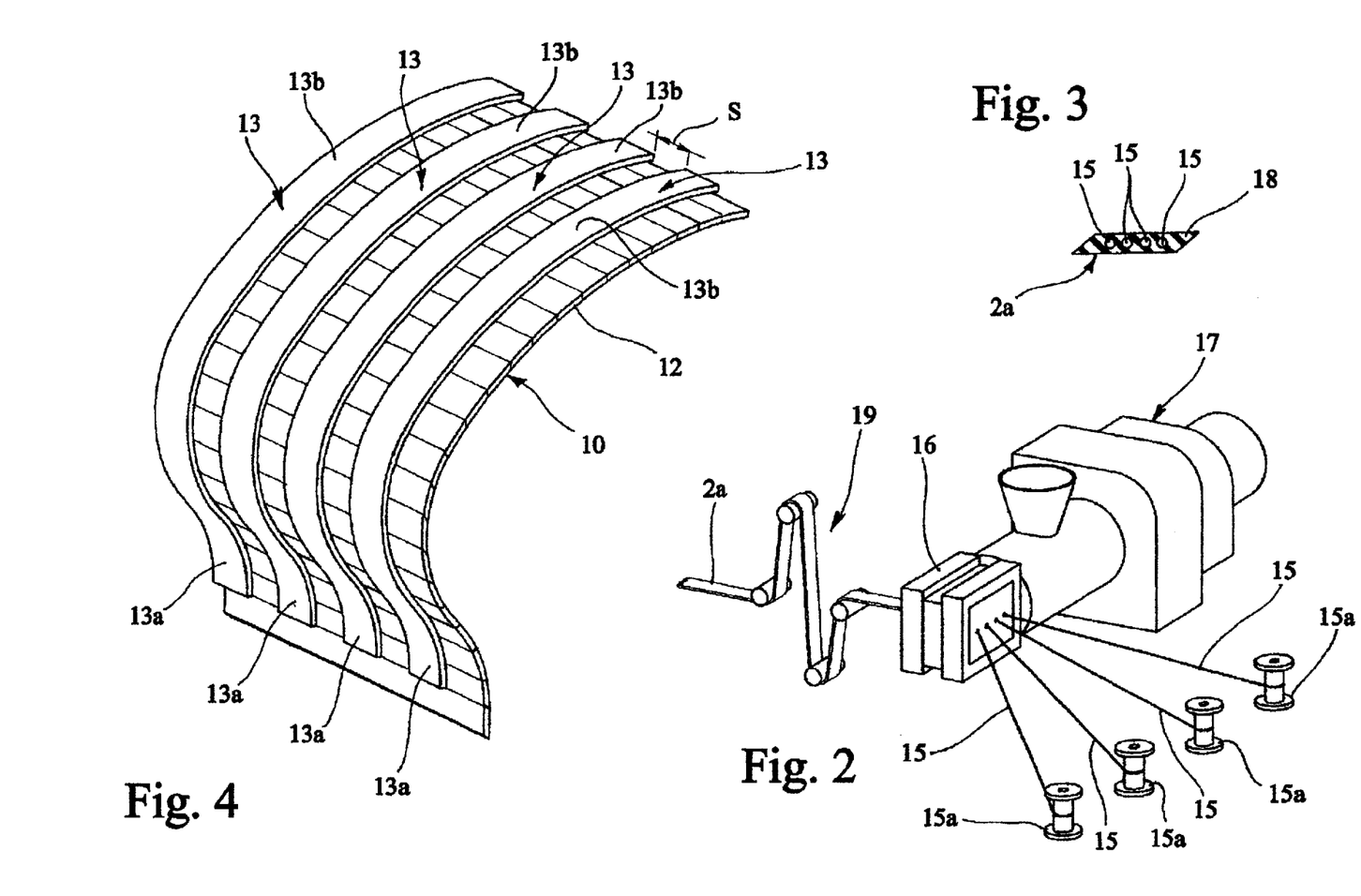
FIG. 2 is a diagram showing accomplishment of a continuous strip-like element intended for forming the carcass ply or plies.
FIG. 3 is a cross-section view of an embodiment of said strip-like element.
FIG. 4 is a fragmentary perspective view diagrammatically showing the deposition sequence of a first series of strip-like sections for formation of a carcass ply in a tyre in accordance with the invention.

As viewed from FIG. 2, preparation of the continuous strip-like element 2a essentially provides that one or more thread-like elements 15, and preferably three to ten thread-like elements 15 fed from respective reels 15a, should be guided through an extruder 16 associated with an extrusion apparatus 17 carrying out feeding of the raw elastomer material through the extruder itself.

It is pointed out that, in the present description, by "extruder" it is intended that part of the extrusion apparatus also identified in this particular field by the term "extrusion head", provided with a so-called "die" passed through by the product being worked at an outlet port shaped and sized according to the geometrical and dimensional features to be given to the product itself.

The elastomer material and thread-like elements 15 are intimately joined together within the extruder 16, thereby generating the continuous strip-like element 2a at the outlet thereof, which element is formed of at least one layer of elastomer material 18 into the thickness of which the thread-like elements themselves are incorporated.

Depending on requirements, it is possible to guide the thread-like elements 15 in the extruder 16 in such a manner that they are not integrally incorporated into the layer of elastomer material 18 but appear on one or both surfaces thereof.

The thread-like elements 15 may each consist for example of a textile cord preferably with a diameter included between 0.6 and 1.2 mm, or a metallic cord preferably with a diameter included between 0.3 and 2.1 mm.

Advantageously, if required, the thread-like elements 15 can be disposed within the continuous strip-like element 2a in such a manner that they give the obtained carcass ply 3 unexpected qualities of compactness and homogeneity. For the purpose, the thread-like elements 15 can be for example disposed according to a thickness greater than six thread-like elements/centimetre, circumferentially measured on the carcass ply 3 close to the equatorial plane of tyre 1. In any case it is preferably provided that the thread-like elements 15 should be disposed in the strip-like element 2a at a mutual distance between centres not lower than 1.5 times the diameter of the thread-like elements themselves, in order to enable an appropriate rubberizing operation between adjacent threads.

The continuous strip-like element 2a coming out of extruder 16 can be advantageously guided, optionally through an accumulator-compensator device 19, on a deposition apparatus the structural and operational features of which are described in more detail in the European patent application No. 97830731.2 in the name of the same Applicant, content of which is herein incorporated by reference.

This deposition apparatus is suitable to sequentially cut the continuous strip-like element 2a into strip-like sections 13, 14 of predetermined length.

Cutting of each strip-like section 13, 14 is immediately followed by deposition of same on the toroidal support 11, giving the strip-like section a U-shaped configuration around the cross-section outline of the toroidal support itself, so that in the strip-like section 13, 14 two side portions 13a, 14a can be identified, which radially extend towards the toroidal support 11 axis at positions radially spaced apart from each other, as well as a crown portion 13b, 14b extending at a radially outer position between the side portions themselves.

The sticky character of the raw elastomer material forming layer 18 coating the thread-like elements 15 ensures a steady adhesion of the strip-like sections 13, 14 on the surfaces of the toroidal support 11, even in the absence of liner 10 on the toroidal support itself. In more detail, the above described adhesion takes place as soon as the strip-like section 13, 14 comes into contact with the toroidal support 11 at a radially external region of its cross-section outline.

In addition to or in place of the above described exploitation of the natural sticky character of the elastomer material, retention of one or more of the strip-like sections 13, 14 on the toroidal support 11 can be obtained by carrying out a suction action produced through one or more appropriate holes arranged on the toroidal support itself.

The toroidal support 11 can be driven in angular rotation with a step by-step movement in synchronism with operation of said deposition apparatus, in such a manner that each cutting action of each strip-like section 13, 14 is followed by deposition of same to a position circumferentially spaced apart from the previously laid-down section 13, 14.

In more detail, rotation of the toroidal support 11 takes place with an angular pitch to which a circumferential displacement corresponds which is a multiple of, and more specifically twice the width of each strip-like section 13, 14.

It is to point out that, to the aims of the present description, when not otherwise stated, the term "circumferential" refers to a circumference lying in the equatorial plane and close to the outer surface of the toroidal support 11.

In accordance with the present invention, the above described operating sequence takes place in such a manner that, by a first complete revolution of the toroidal support 11 around its own axis, deposition of the first series of strip-like sections 13 occurs, said sections 13 being distributed with a circumferential pitch corresponding to twice the width of each of them. Therefore, as can be clearly viewed from FIG. 4, between one and the other of the sections belonging to the first series an empty space "S" is left which, at least at the crown portions 13b of said sections, has a width equal to that of the sections themselves.

Depending on requirements, deposition of the strip-like sections 13 belonging to the first series can take place in planes radial to the rotation axis of the toroidal support 11, or parallelly offset with respect to this radial plane, as described in the European patent application No. 98830778.1 in the name of the same Applicant.

In addition, this deposition can be executed following an inclined orientation relative to the circumferential extension direction of the toroidal support 11, at an angle included between 3 and 15 degrees, for example.

Adjustment of the deposition angle of the strip-like sections can be for example obtained by suitably orienting the geometric rotation axis of the drum relative to the deposition apparatus.

Accomplishment of a carcass structure 2 then goes on with the step of applying the above mentioned annular reinforcing structures 4 to an area close to each of the inner circumferential edges of the carcass ply 3 being manufactured, for the purpose of obtaining the carcass regions known as "beads", specifically intended for ensuring anchoring of the tyre to a corresponding mounting rim.

Figure 5:
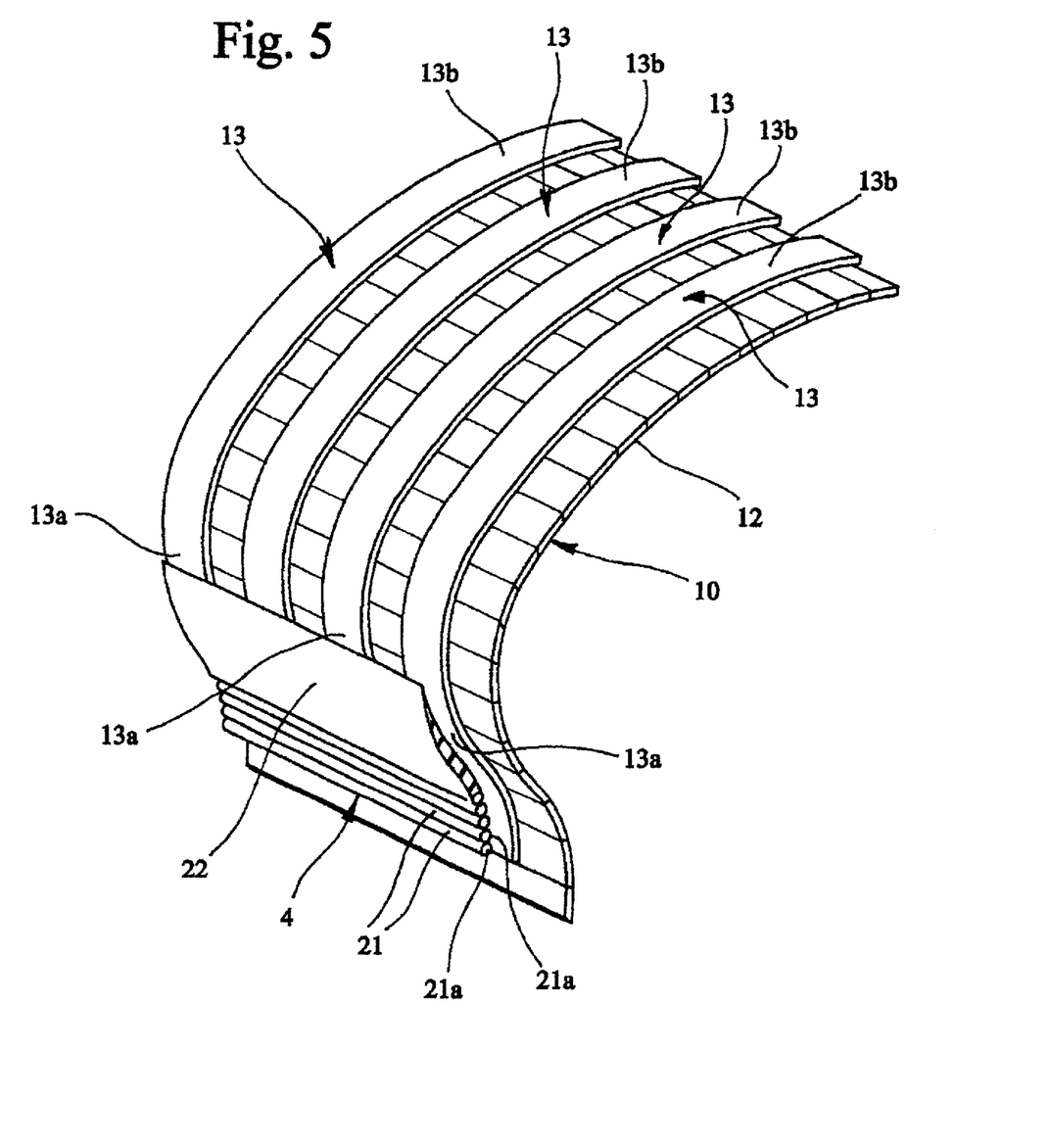
FIG. 5 is a fragmentary perspective view of an annular reinforcing structure laterally applied to the end flaps of the strip-like sections belonging to the first series.

Each of said annular reinforcing structures 4 preferably comprises an individual annular anchoring insert 21 which is substantially inextensible in a circumferential direction and substantially has the form of a crown concentric with the geometric rotation axis of the toroidal support 11, said insert being placed at a circumferentially inner position against the end flaps of the strip-like sections 13 belonging to the first series.

The annular anchoring insert 21 is made up of at least one elongated metal element wound up into several substantially concentric coils 21a. Coils 21a can be defined either by a continuous spiral or by concentric rings formed of respective elongated elements.

Combined with the annular anchoring insert 21 is a filling body 22 of elastomer material, preferably of the thermoplastic type, of a hardness included between 48° and 55° Shore D, measured at a temperature of 23° C., and preferably having a radial extension greater than the radial extension of the annular anchoring insert 21.

Preferably, the filling body 22 is placed at a radially external position relative to the annular anchoring insert 21. In more detail, the filling body 22 has a radially inner edge connected to the annular anchoring insert 21 and extends radially, tapering away from the annular insert itself. Preferably, the ratio between the radial extension of the annular insert 21 and the radial extension of the filling body 22 is included between 0.5 and 2.5

To the aims of the present invention, by "radial extension" it is intended the difference between a maximum radius and a minimum radius measured at the radially outer edge and the radially inner edge respectively of the filling body 22 and/or the annular anchoring insert 21.

In accordance with a preferential embodiment, the annular anchoring insert 21 is manufactured directly against the end flaps of the strip-like sections 13, through formation of coils 21a by winding up of the elongated element, optionally with the aid of rollers or other suitable devices acting against the surface of the toroidal support 11.

The sticky character of the elastomer layer 18 coating the strip-like sections 13 belonging to the first series, as well as of the optional liner 10 previously laid down on the drum itself, ensure a steady positioning of the individual coils 21a during the forming step.

Deposition of the elongated element can also be advantageously preceded by a rubberizing step in which the elongated element itself is coated with at least one layer of raw elastomer material that, in addition to ensuring an excellent rubber-metal bond on the elongated element, further promotes adhesion of same.

Subsequently, the filling body 22 can be in turn formed directly in contact with the annular anchoring insert 21 by, for example, applying a continuous strip of elastomer material coming out of an extruder located close to the drum 11. The continuous strip may have the definitive conformation in section of the filling body 22 already on coming out of the respective extruder. Alternatively, the continuous strip will have a reduced section relative to that of the filling body, and the latter will be obtained by applying the strip in several coils disposed in side by side and/or overlapped relationship, to define the filling body 22 in its final configuration.

After application of the annular reinforcing structures 4, formation of the carcass ply 3 is completed by deposition of the second series of strip-like sections 14 which are obtained by cutting the continuous strip-like element 2a to size and are applied to the toroidal drum 11 in the same manner as described for the strip-like sections 13 belonging to the first series.

Figure 6:
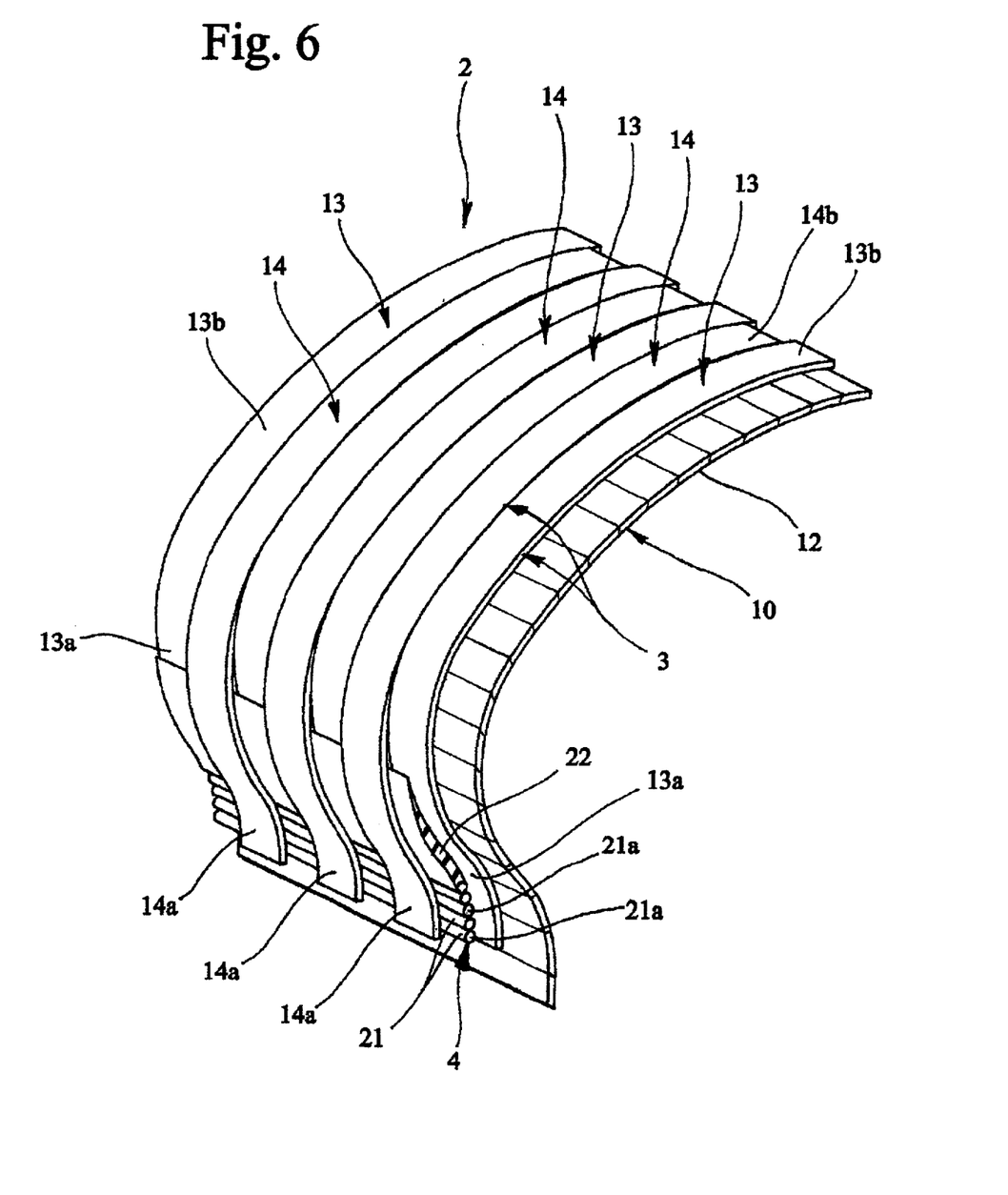
FIG. 6 is a fragmentary perspective view diagrammatically showing the deposition sequence of a second series of strip-like sections having respective end flaps overlapping the annular reinforcing structure.

As clearly viewed from FIG. 6, each section 14 belonging to the second series is laid down in a U-shaped conformation around the cross-section outline of the toroidal support 11, between two consecutive sections 13 belonging to the first series and with an orientation parallel to said sections. In more detail, each section 14 belonging to the second series has the respective crown portion 14*b* circumferentially interposed between the crown portions 13*a* of sections 13 belonging to the first series, to fill the space "S" present between them, and a pair of side portions 14*a* carrying the end flaps of the section itself in overlapping relationship with the respective annular reinforcing structures 4, at axially opposite positions relative to the end flaps of sections 13 belonging to the first series.

In other words, each annular reinforcing structure 4, of a cross-section outline tapering away from the tyre axis, has an axially inner side turned towards the end flaps of the strip-like, sections 13 belonging to the first series, and an axially outer side turned towards the end flaps of sections 14 belonging to the second series.

It may be also provided that the side portions 14*a* of each section 14 belonging to the second series should partly cover the side portions 13*a* of two consecutive sections 13 belonging to the first series, each at a stretch included between the radially outer edge of the respective annular reinforcing structure 4 and the transition region between the side portion itself and the crown portion 13*b*, 14*b*.

Due to the mutual convergence between the contiguous side portions 13*a*, 14*a*, oriented radially of the geometric axis of the toroidal support 11, overlapping or covering of the side portions 13*a* of sections 13 belonging to the first series, i.e. the circumferential width of the overlapping regions, is progressively decreasing starting from a maximum value close to the radially outer edge of the first portion 4a of each annular reinforcing structure 4, until a zero value at the transition region between the side portions 13*a*, 14*a* and the crown portions 13*b*, 14*b*.

If close to the beads a more homogeneous distribution of the thread-like elements 15 forming sections 13, 14 of the first and second series respectively should be wished, a pressing step may be provided to be executed on the continuous strip-like element 2*a* at the regions of the longitudinal extension of same corresponding to the ends of the strip-like sections 13, 14 to be obtained by cutting. In this way, on the extension of each strip-like section 13, 14 regions of increased width are defined that are placed close to the inner circumferential edges of the formed carcass ply 3.

The pressing action causes a thickness reduction in the elastomer layer 18 and an increase in the width of the strip-like element 2*a* which, as a result, will give rise to mutual spacing apart of the thread-like elements 15. By so doing, the end flaps of each section 13, 14 can be widened until they reach, at their circumferentially inner ends, a width which is even twice that of the crown portions 13*b*, 14*b* and at all events capable of completely covering the respective inner and outer sides of each annular reinforcing structure 4.

In tyres of the radial type, a belt structure 5 is usually applied to the carcass structure 2.

This belt structure 5 may be made in any manner convenient for a person skilled in the art and essentially comprises a primary belt strip 7, for example obtained by winding up at least one continuous cord into coils axially disposed in side by side relationship on the carcass ply 3. Concurrently with said primary strip 7, further reinforcing layers may be also provided; they are conveniently made up of strips of fabric and/or felted materials, i.e. layers of a blend charged with short reinforcing fibres of the aramidic type for example.

In the example shown the belt structure further comprises first and second auxiliary belt strips 6*a*, 6*b* having cords of respectively crossed orientation, disposed at a radially inner position relative to the primary strip 7.

Then the tread band 8 and sidewalls 9, that can be also obtained in any manner convenient for a person skilled in the art, are applied to the belt structure 5.

Tyre 1 thus manufactured can be now submitted, after removal from support 11, to a vulcanization step that can be carried out in any known and conventional manner.

The present invention achieves important advantages.

The carcass structure of the invention in fact lends itself to be obtained directly on a toroidal support on which the whole tyre can be advantageously formed. In this way all problems connected with manufacture, storage and management of semifinished products, that are common to manufacturing processes of traditional conception, are eliminated.

Compared with the method described in document U.S. Pat. No. 5,362,343, the manufacturing times for each carcass ply can be greatly reduced, due to the simultaneous deposition of as many thread-like elements as they are contained in each strip-like section 13, 14 or in the continuous strip-like element 2*a* from which sections 13, 14 come. Employment of the strip-like sections 13, 14 also dispenses with the need for previously depositing liner 10 on the toroidal support 11. In fact, the elastomer layer 18 employed in forming the continuous strip-like element 2*a* is able by itself to ensure an efficient adhesion of element 2*a* to the toroidal support 11, thereby ensuring a steady positioning of the individual sections 13, 14.

Accuracy in positioning the strip-like elements 13, 14 and the thread-like elements integrated thereinto is further improved by the fact that each strip-like section has a great structural consistency that makes it insensitive to vibrations or similar oscillation effects which can be transmitted from the deposition apparatus.

In this connection it is to note that deposition of individual cords, as described in U.S. Pat. No. 5,362,343, may be somewhat problematic, due exactly to vibrations and/or oscillations undergone by said cords during the deposition step.

Furthermore, simultaneous deposition of a plurality of thread-like elements in accordance with the invention enables the deposition apparatus to be operated at slower rates than required when deposition of individual cords is concerned, which is a further advantage in terms of working accuracy without on the other hand impairing productivity.

Besides, deposition of strip-like sections directly crownwise to a toroidal support of an outline substantially identical with that of the finished tyre enables thicknesses to be achieved that cannot be reached with known methods in the art, providing deposition of a carcass ply in the form of a cylindrical sleeve and subsequent shaping of same into a toroidal form, with consequent thinning of the carcass ply cords disposed crownwise to the finished tyre.

In addition to the above, each strip-like section can be steadily fastened to the toroidal support by a vacuum effect produced through possible suction ducts, which steady fastening by vacuum cannot be achieved by known processes carrying out deposition of individual cords.

If required, the side portions of the strip-like sections can be disposed with a suitably increased inclination relative to a direction radial to the toroidal support axis, which will enable expansion undergone by the tyre during the stretching step imposed to it on vulcanization to be efficiently helped. Under these circumstances, in fact, the side portions 13a, 14a tend to take an orientation in a plane radial to the tyre by effect of the expansion imposed to the tyre.

The construction and structure conception of the subject tyre, specifically with reference to its carcass structure 2, enables important improvements to be achieved in terms of structural strength, in particular close to the sidewalls and beads, where a greater structural strength is usually required, as well as in terms of road behaviour, while at the same time benefiting from all advantages typically correlated with a one-ply carcass structure.

In particular, the construction features of the inextensible annular structures 4 and the modalities according to which they are integrated into the carcass ply 3 are adapted to give an excellent structural strength to tyre 1, while greatly limiting the tyre thickness at the beads, in compliance with typical requirements of motorcycle tyres.

In fact, the presence of the circumferentially inextensible annular inserts 21, the coils 21a of which are intimately joined to the carcass ply 3 and substantially oriented perpendicularly of the thread-like elements 15 belonging to the different series of strip-like sections 13, 14, offers an excellent bonding action with the thread-like elements themselves. Thus the carcass structure 2 is greatly strengthened at the regions corresponding to the tyre beads without for the purpose requiring use of additional strip-like inserts, usually called "flippers", wound up like a slipknot around the annular reinforcing structures 4, use of which is to be made, on the contrary, in the known art.

What is claimed is:

1. A carcass structure for a tyre for a two-wheeled vehicle, comprising:
    at least one carcass ply comprising a first series of strip sections and at least one second series of strip sections circumferentially distributed in a mutually-alternated sequence around a geometric rotation axis of the tyre;
    each of the strip sections comprising longitudinal and parallel thread elements at least partly coated with at least one layer of elastomer material;
    each of the strip sections extending in a substantially U-shaped configuration to define two side portions, mutually spaced apart in an axial direction, and a crown portion, extending at a radially-outer position between the side portions; and
    a pair of annular reinforcing structures applied against end flaps of the strip sections of the first series and overlapped by end flaps of the strip sections of the at least one second series;
    wherein each of the annular reinforcing structures comprises:
        an annular anchoring insert, substantially in a form of an annulus, disposed coaxially relative to the carcass structure, comprising one or more elongated elements extending in radially-concentric coils; and
        at least one filling body disposed at a radially-outer position relative to the annular anchoring insert.

2. The carcass structure of claim 1, wherein the crown portions of the strip sections of the first series and the crown portions of the strip sections of the at least one second series are disposed in mutual side-by-side relationship along a circumferential extension of the carcass structure.

3. The carcass structure of claim 2, wherein the side portions of each strip section of the first series are each partly covered with a side portion of at least one adjacent strip section of the at least one second series at a stretch included between a radially-outer edge of respective annular reinforcing structures and a transition region between the side portions and the crown portion of the strip sections of the first series.

4. The carcass structure of claim 3, wherein covering of the side portions of each strip section of the first series progressively decreases starting from a maximum value close to the radially-outer edge of the respective annular reinforcing structures until reaching a zero value at the transition region between the side portions and the crown portion of the strip sections of the first series.

5. The carcass structure of claim 1, wherein the side portions of the strip sections radially converge in a direction of a geometric rotation axis of the carcass structure.

6. The carcass structure of claim 1, wherein the strip sections of the first series are disposed according to a circumferential distribution pitch corresponding to a multiple of a width of the strip sections of the first series, or
    wherein the strip sections of the at least one second series are disposed according to a circumferential distribution pitch corresponding to a multiple of a width of the strip sections of the at least one second series.

7. The carcass structure of claim 1, wherein each strip section comprises regions of increased width at areas close to inner circumferential edges of the carcass structure.

8. The carcass structure of claim 7, wherein the thread elements of each strip section are mutually spaced apart at the regions of increased width.

9. The carcass structure of claim 1, wherein each of the strip sections comprises a width greater than or equal to 3 mm and less than or equal to 15 mm.

10. The carcass structure of claim 1, wherein each of the strip sections comprises greater than or equal to three thread elements and less than or equal to eight thread elements.

11. The carcass structure of claim 1, wherein the thread elements of the strip sections are disposed according to a mutual distance between centers greater than or equal to 1.5 times a diameter of the thread elements.

12. The carcass structure of claim 1, wherein the annular anchoring inserts each comprise a single series of radially-superposed concentric coils.

13. The carcass structure of claim 1, wherein the at least one filling body radially extends from a respective annular anchoring insert, tapering away from the respective annular anchoring insert.

14. The carcass structure of claim 1, wherein a ratio of a radial extension of the annular anchoring insert to a radial extension of the at least one filling body is greater than or equal to 0.5:1 and less than or equal to 2.5:1.

15. The carcass structure of claim 1, wherein the at least one filling body comprises a hardness greater than or equal to 48° Shore D at 23° C. and less than or equal to 55° Shore D at 23° C.

16. A tyre for a two-wheeled vehicle, comprising a carcass structure made by a method comprising:
    preparing strip sections, each comprising longitudinal and parallel thread elements at least partly coated with at least one layer of a first elastomer material;
    laying down and circumferentially distributing a first series of the strip sections on a toroidal support, each of the strip sections of the first series extending in a substantially U-shaped configuration around a cross-section outline of the toroidal support to define two side portions, mutually spaced apart in an axial direction, and a crown portion, extending at a radially-outer position between the side portions; and
    applying annular reinforcing structures against end flaps of the strip sections of the first series;

wherein formation of each annular reinforcing structure comprises:
  laying down one or more elongated elements in radially-concentric coils to form an annular anchoring insert, substantially in a form of an annulus, disposed coaxially relative to the carcass structure;
  forming at least one filling body of a second elastomer material;
  joining the at least one filling body to the annular anchoring insert at a radially-outer position relative to the annular anchoring insert; and
  laying down and circumferentially distributing at least one second series of the strip sections on the toroidal support, each of the strip sections of the at least one second series extending in a substantially U-shaped configuration around a cross-section outline of the toroidal support, between two strip sections of the first series, to define a carcass ply;
wherein each of the strip sections of the at least one second series defines two side portions, mutually spaced apart in an axial direction and having end flaps overlapping the annular reinforcing structures, and a crown portion, extending at a radially-outer position between the side portions.

17. A tyre for a two-wheeled vehicle, comprising:
at least one carcass ply comprising a first series of strip sections and at least one second series of strip sections circumferentially distributed in a mutually-alternated sequence around a geometric rotation axis of the tyre;
each of the strip sections comprising longitudinal and parallel thread elements at least partly coated with at least one layer of elastomer material;
each of the strip sections extending in a substantially U-shaped configuration to define two side portions, mutually spaced apart in an axial direction, and a crown portion, extending at a radially-outer position between the side portions; and
a pair of annular reinforcing structures applied against end flaps of the strip sections of the first series and overlapped by end flaps of the strip sections of the at least one second series;
wherein each of the annular reinforcing structures comprises:
  an annular anchoring insert, substantially in a form of an annulus, disposed coaxially relative to the carcass structure, comprising one or more elongated elements extending in radially-concentric coils; and
  at least one filling body disposed at a radially-outer position relative to the annular anchoring insert.

18. The tyre of claim 17, wherein the crown portions of the strip sections of the first series and the crown portions of the strip sections of the at least one second series are disposed in mutual side-by-side relationship along a circumferential extension of the carcass structure.

19. The tyre of claim 18, wherein the side portions of each strip section of the first series are each partly covered with a side portion of at least one adjacent strip section of the at least one second series at a stretch included between a radially-outer edge of respective annular reinforcing structures and a transition region between the side portions and the crown portion of the strip sections of the first series.

20. The tyre of claim 19, wherein covering of the side portions of each strip section of the first series progressively decreases starting from a maximum value close to the radially-outer edge of the respective annular reinforcing structures until reaching a zero value at the transition region between the side portions and the crown portion of the strip sections of the first series.

21. The tyre of claim 17, wherein the side portions of the strip sections radially converge in a direction of a geometric rotation axis of the carcass structure.

22. The tyre of claim 17, wherein the strip sections of the first series are disposed according to a circumferential distribution pitch corresponding to a multiple of a width of the strip sections of the first series, or
  wherein the strip sections of the at least one second series are disposed according to a circumferential distribution pitch corresponding to a multiple of a width of the strip sections of the at least one second series.

23. The tyre of claim 17, wherein each strip section comprises regions of increased width at areas close to inner circumferential edges of the carcass structure.

24. The tyre of claim 23, wherein the thread elements of each strip section are mutually spaced apart at the regions of increased width.

25. The tyre of claim 17, wherein each of the strip sections comprises a width greater than or equal to 3 mm and less than or equal to 15 mm.

26. The tyre of claim 17, wherein each of the strip sections comprises greater than or equal to three thread elements and less than or equal to eight thread elements.

27. The tyre of claim 17, wherein the thread elements of the strip sections are disposed according to a mutual distance between centers greater than or equal to 1.5 times a diameter of the thread elements.

28. The tyre of claim 17, wherein the annular anchoring inserts each comprise a single series of radially-superposed concentric coils.

29. The tyre of claim 17, wherein the at least one filling body radially extends from a respective annular anchoring insert, tapering away from the respective annular anchoring insert.

30. The tyre of claim 17, wherein a ratio of a radial extension of the annular anchoring insert to a radial extension of the at least one filling body is greater than or equal to 0.5:1 and less than or equal to 2.5:1.

31. The tyre of claim 17, wherein the at least one filling body comprises a hardness greater than or equal to 48° Shore D at 23° C. and less than or equal to 55° Shore D at 23° C.

* * * * *